Nov. 19, 1935.  H. HARDINGE  2,021,304
SEDIMENTATION APPARATUS
Filed Jan. 4, 1933  5 Sheets-Sheet 1

INVENTOR
HARLOWE HARDINGE
BY
ATTORNEY

Nov. 19, 1935.  H. HARDINGE  2,021,304
SEDIMENTATION APPARATUS
Filed Jan. 4, 1933  5 Sheets-Sheet 4

INVENTOR
HARLOWE HARDINGE
BY
*Malcolm F. Gannett*
ATTORNEY

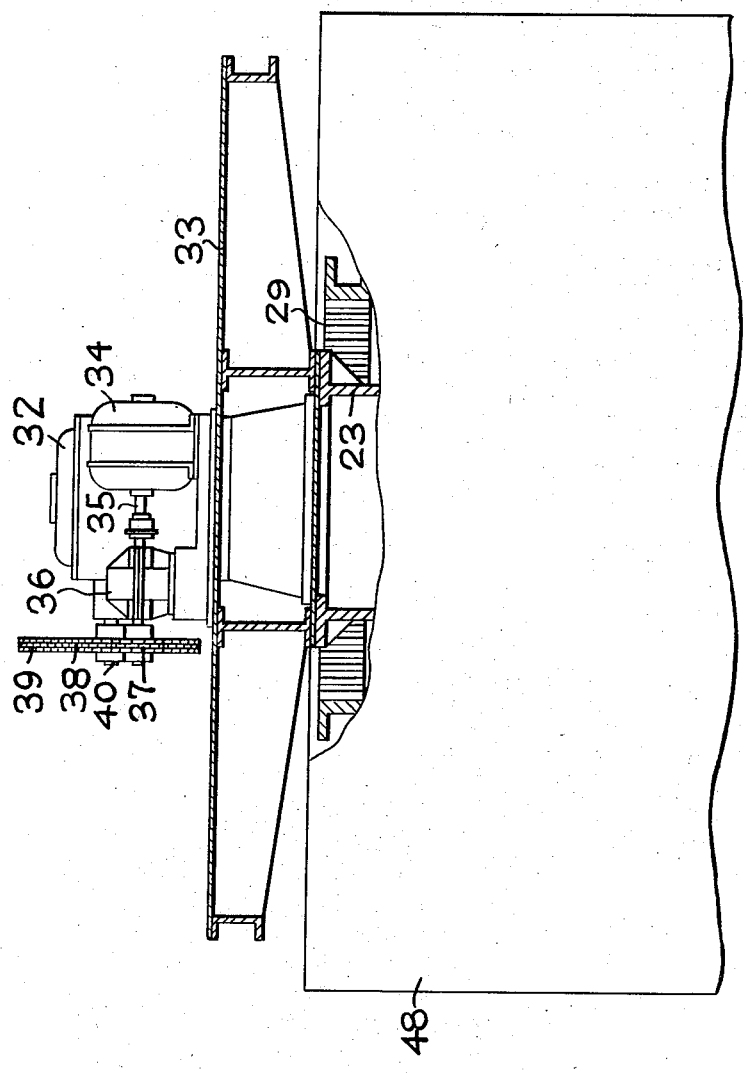

Patented Nov. 19, 1935

2,021,304

UNITED STATES PATENT OFFICE 2,021,304

SEDIMENTATION APPARATUS

Harlowe Hardinge, York, Pa., assignor to Hardinge Company, Incorporated, York, Pa., a corporation of New York Application January 4, 1933, Serial No. 650,065

1 Claim. (Cl. 210—55)

This invention relates to sedimentation apuaratus of the type of thickeners or clarifiers in which solids suspended in liquids are settled to the bottom of the apparatus by sedimentation, wherein the settled solids in the form of sludge are raked to a central sludge discharge. The rakes depend from more or less radially extending rake arms which are propelled from a rotatable vertical support. More particularly the invention relates to the arrangement of the vertical rotatable support mechanism and the means for rotating said support.

An object of the invention is to provide an improved sedimentation apparatus in which the sludge discharge rakes are arranged in a manner which avoids the necessity of any overhead supporting truss or bridge which has been considered necessary heretofore in apparatus of this type.

Another object of the invention is to provide an improved sedimentation apparatus in which the rakes and the driving mechanism therefor are supported on an upright pier centrally disposed in the sedimentation tank.

Another object of the invention is to provide improved means for delivering the feed into the sedimentation tank, so that the incoming feed is stilled and then distributed uniformly around the central pier.

Another object of the invention is to provide an improved sedimentation apparatus of the character mentioned, which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawings:—

Fig. 5 is a view partly in section of the driving mechanism, as seen at right angles to Fig. 3.

Figure 1:
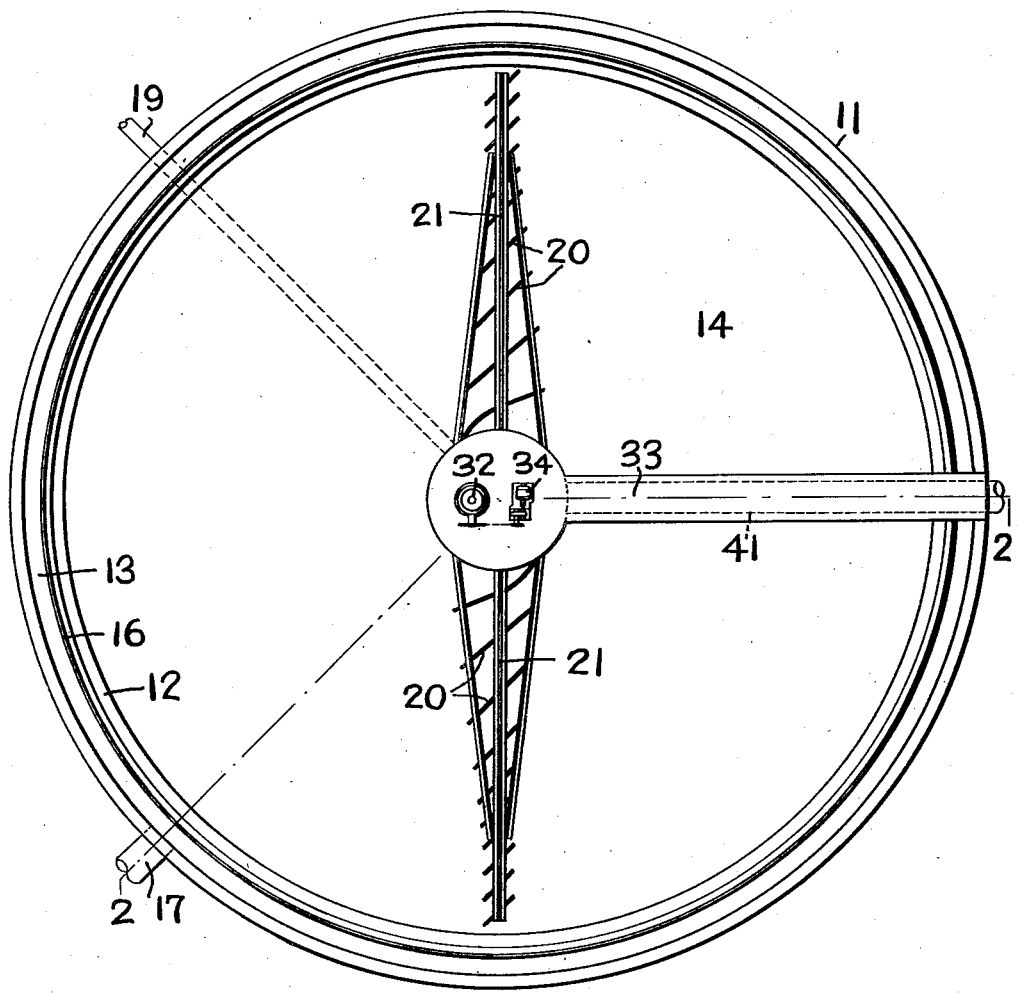
Figure 1 is a plan of a sedimentation apparatus constructed according to the present invention.
Figure 2:
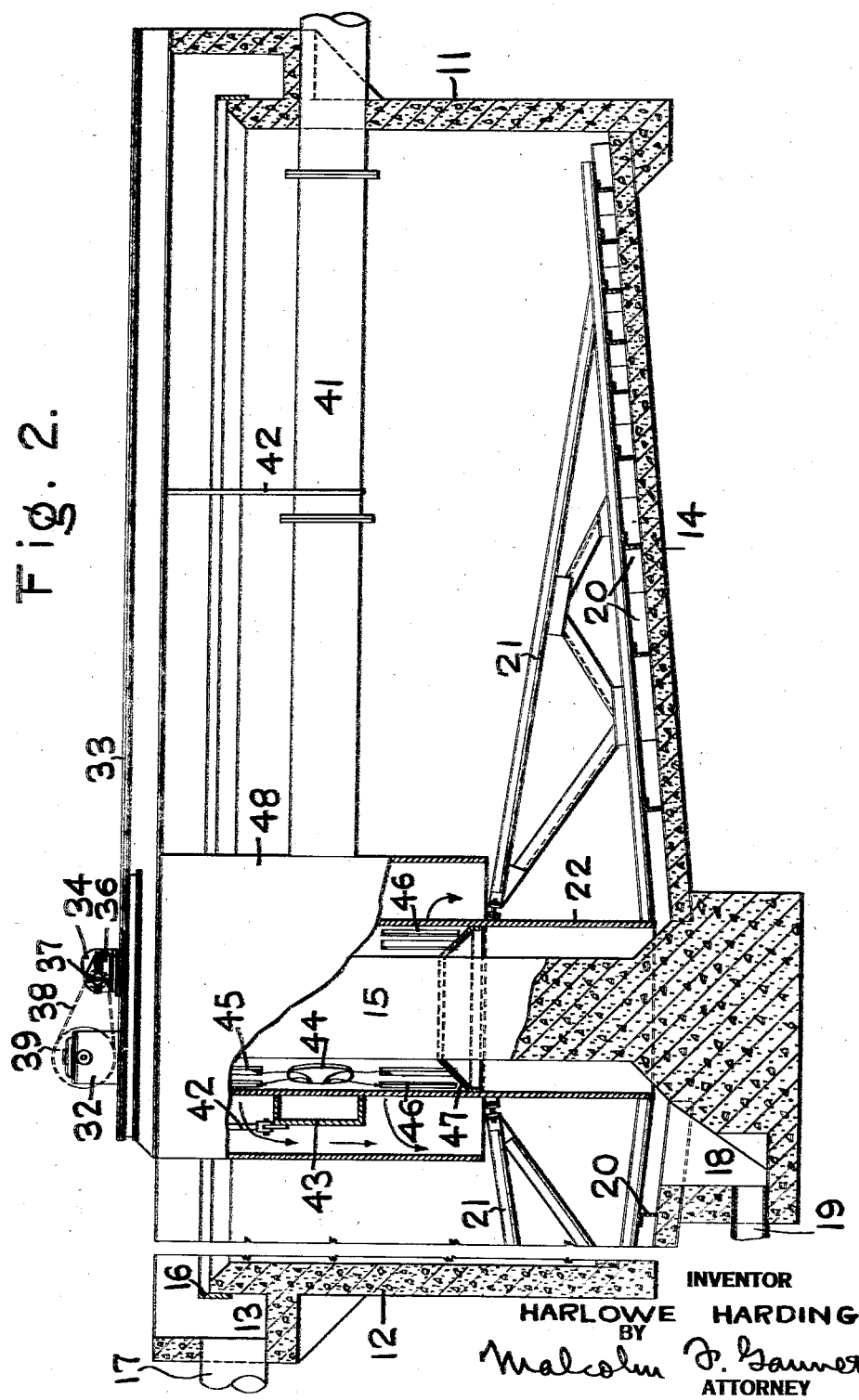
Fig. 2 is a vertical transverse section taken opproximately on the line 2—2 of Fig. 1.

Referring to the drawings and especially to Figs. 1 and 2, the improved sedimentation apparatus may comprise a tank 11 for holding the liquid from which solids in suspension are to be removed. The tank 11 is shown as being circular in form and constructed from concrete or other cementitious material, however, it will be understood that the tank may be constructed from any other suitable material and have any other configuration when so desired.

The tank 11 has a side wall 12 which is formed with an overflow trough 13, and an inclined bottom 14 which slopes downwardly toward the center of the tank. An upstanding column or pier 15 is located in the center of the tank.

When the tank 11 is formed of concrete or other cementitious material the side wall 12, trough 13, bottom 14, and pier 15 may be integrally constructed as shown in Fig. 2.

A weir 16 is disposed around the inner edge of the trough 13, and the liquid is adapted to flow over this weir into the trough in a well known manner.

An effluent pipe 17 is connected to the trough 13 for the purpose of carrying off the liquid from said trough.

Solids settling to the bottom 14 by sedimentation take the form of sludge which is raked or impelled toward a bottom sludge discharge hopper 18 from which the sludge is removed through a discharge pipe 19.

For the purpose of raking or impelling the sludge on the bottom 14 toward the hopper 18, I prefer to use a plurality of rakes or plows 20 which are supported or depend from rake arms 21.

In the present instance the apparatus is shown as having two diametrically disposed rake arms 21 which extend more or less radially from a central vertical rotatable support or drum 22 which surrounds the pier 15 and is spaced a suitable distance therefrom.

The drum 22, and consequently the rakes 20 carried thereby, are adapted to be slowly rotated, and accordingly one of the novel features of the present invention is the manner of supporting the drum 22 and the manner of mounting the mechanisms for operating said drum.

Figure 3:
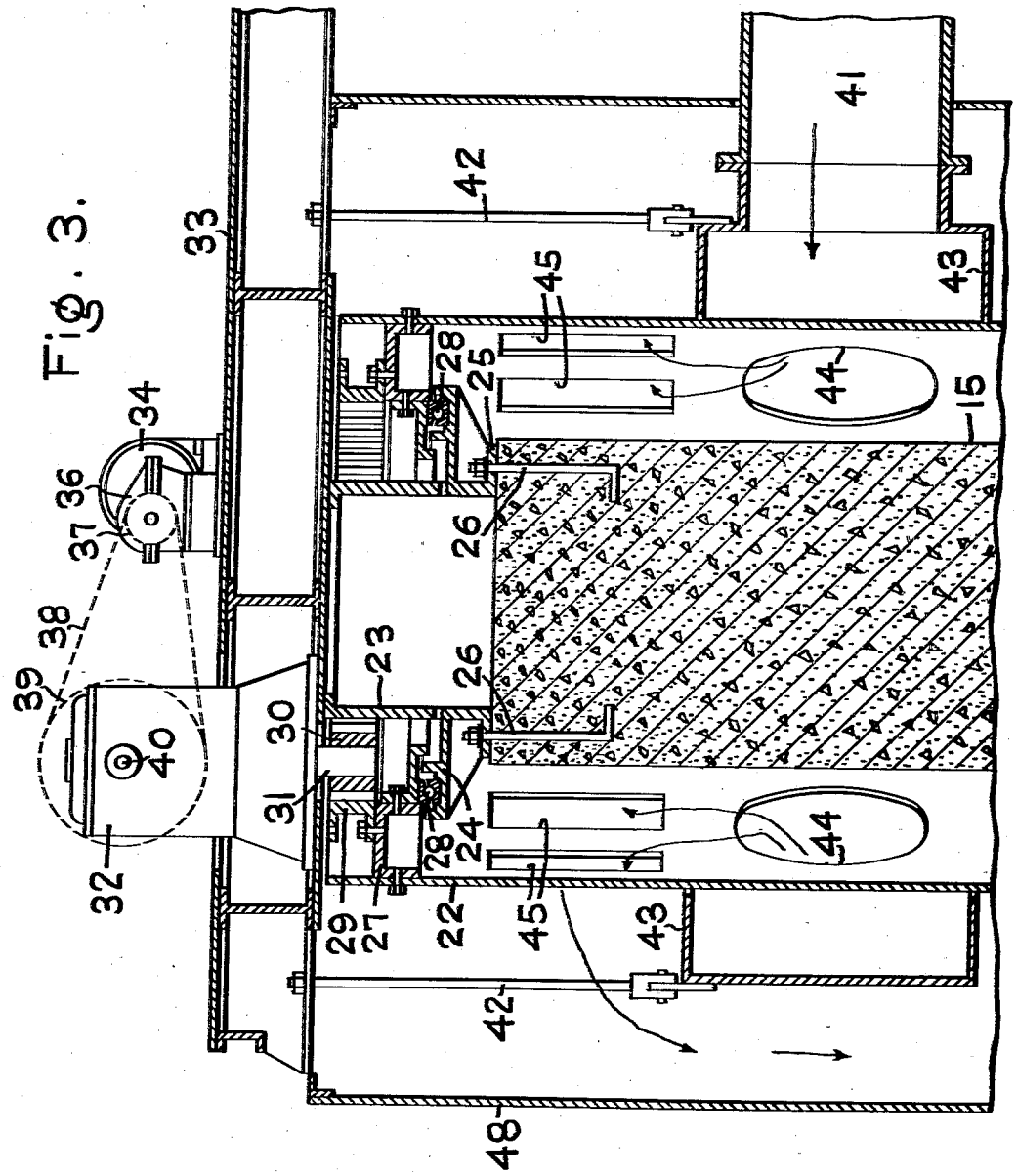
Fig. 3 is an enlarged section of the upper portion of the central pier and the parts carried thereby.
Figure 4:
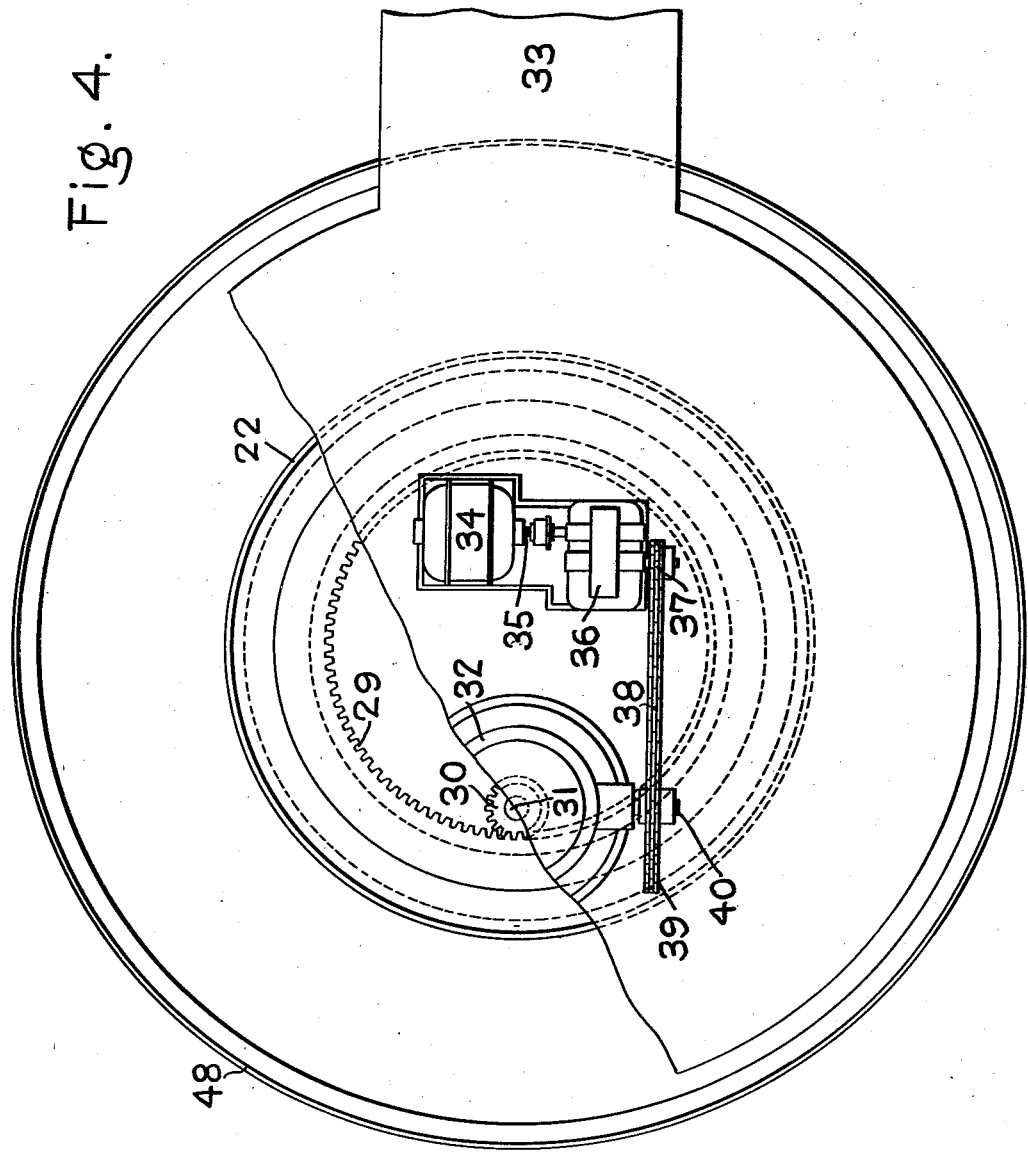
Fig. 4 is a plan of the structure shown in Fig. 3.

Mounted on top of the pier 15 is a skeleton casting 23 which constitutes a platform or framework which forms substantially an extension of the pier 15. The casting comprises a main annular body portion, indicated by the numeral 23 in Figure 3, and surrounding the exterior of this main body portion and disposed above the bottom thereof, is a substantially horizontal flange 24, the purpose of which will be hereinafter described. Beneath the flange 24 there is a second flange 25 which is used for securing the framework 23 on to the top of the pier 15, anchor bolts 26 carried by the pier being preferably used for this purpose.

Mounted in the upper portion of the drum 22 is a turntable or flanged ring 27 which overlies the flange 24 of the framework 23.

Interposed between the flange 24 and the turntable 27, are anti-friction devices, such as ball bearings 28.

Fixed to the turntable 27 is a ring gear 29 which is in meshing relationship with a pinion 30 on the lower end of a vertical shaft 31 of a speed reducer 32 mounted on a bridge or walkway 33.

The bridge or walkway 33 extends from the periphery or wall 12 of the tank 11 outwardly to the framework or platform 23, so as to provide means for enabling an operator to inspect the mechansim mounted on the pier 15. The operating mechanism is also mounted on the bridge or walkway 33.

The driving mechanism includes a stationary electric motor 34, the shaft 35 of which is operatively connected to a second speed reducer 36.

The speed reducer 36 is operatively connected to the speed reducer 32 heretofore referred to by a pulley or sprocket 37, belt or chain 38, and pulley or sprocket 39, the pulley or sprocket 39 being mounted on a shaft 40 of the speed reducer 32.

The speed reducer 36 may be of the herringbone gear type of speed reducer, and the speed reducer 32 may be a right angle planetary type of speed reducer. Since both of these forms of speed reducers can be readily obtained in the market, it is not deemed necessary to show the construction thereof in detail.

The feed may be brought in by a radial feed launder so that it is fed to the apparatus centrally thereof.

In the present instance the incoming liquid is shown as being conveyed through an influent pipe 41 which is supported from the bridge or walkway 33 by rods 42.

The inner end of the pipe 41 terminates in an annular influent trough 43 of channel form, the trough 43 being closed at the top, bottom and outside, and open at the inside. The inner open portion of the trough 43 surrounds the drum 22, and since the trough is stationary while the drum 22 is rotatable, a slight clearance is left between the inner edges of the trough and the exterior of the drum so as to permit free movement of the drum relatively to the trough.

Openings 44 are formed in the portion of the drum 22 which is enclosed by the influent trough 43, through which the liquid flows into the drum from the influent pipe 41.

Above and also below the openings 44, the wall of the drum 22 is formed with elongated slots 45 and 46, respectively.

Carried by the drum 22 and disposed near the bottom of the slots 46, is a baffle plate 47 which prevents the incoming liquid which enters the chamber between the drum 22 and the pier 15 from flowing downwardly towards the bottom of the tank 11.

Surrounding the trough 43 and depending from the bridge or walkway 33, is a relatively large cylindrical baffle 48. The baffle 48 extends downwardly into the tank 11 to a point immediately above the rake arms 21. The bottom of the baffle 48 is open.

The liquid discharged from the pipe 41 into the trough 43, flows from said trough through the openings 44 to the chamber between the drum 22 and pier 15. From this chamber the liquid flows outwardly through the slots 45 and 46 to the chamber or space between the cylindrical baffle 48 and the drum 22 and from thence the liquid discharges into the tank through the open bottom of the baffle 48, as shown by the arrows in Figures 2 and 3.

Since the feed being delivered by the pipe 41 has considerable velocity, by providing the series of baffles and also the serpentine course through which the liquid is delivered into the tank, the liquid will be diffused in such a manner that it is stilled, and hence the force of the liquid passing out through the bottom of the baffle 48 will be reduced to such an extent that the quiet or still liquid in the tank 11 will not be agitated or disturbed by the incoming liquid feeding into the tank 11.

In operation, the liquid with its solids in suspension to be clarified or thickened by sedimentation is flowed into the sedimentation tank 11 in a continuous manner and the clarified liquid is flowed therefrom as effluent in a continuous manner. Solids settling out of the liquid fall to the bottom of the tank 11 in the form of sludge and are collected by the rakes 20 which are moved by means of the rake arms 21 which are rotated by the central vertical element or drum 22. So much of the invention is customary.

The invention is embodied in the arrangement wherein the platform or framework 23 on the central pier 15 serves a dual purpose of forming a support for the rotatable drum 22 equipped with sludge discharge rakes and the motor drive mechanism for revolving the drum.

Operation of the motor 34 through the speed reducers 36 and 32, shaft 31, and pinion 30 causes the gear 29 to rotate and consequently the flanged ring or turntable 27 and the drum 22 fixed thereto are rotated. Rotation of the drum 22 with its rake arms and rakes causes settled sludge to be conveyed to the sludge discharge 18, from which it is withdrawn through the pipe 19 in any approved manner.

From the foregoing it will be noted that I have provided an improved sedimentation apparatus which is more sightly than the similar types of apparatus heretofore constructed for similar purposes. Furthermore, the improved manner of feeding the liquid to the tank and discharging the sludge therefrom reduces the costs of construction considerably. Also, by utilizing the center pier as a supporting means for the sludge discharge mechanism etc., the use of any overhead supporting truss or bridge is avoided. It will thus be seen that the invention provides a neat and compact arrangement of the essential parts of sedimentation apparatus, which is cheap to build, is attractive in appearance, and is practically fool-proof.

Having thus described the invention what I claim is:

Apparatus of the type described comprising a tank having a centrally disposed upstanding pier, a rotatable drum surrounding said pier and spaced therefrom to provide a chamber for receiving fresh liquid fed into the apparatus, a feed pipe extending from the periphery of the tank towards said pier, a stationary trough connected to the inner end of said feed pipe and encircling said drum, means forming a communication between said trough and the interior of said drum through which the feed is delivered into the chamber between the drum and the pier, an enlarged stationary cylindrical baffle encircling said trough and also the upper portion of said drum and said pier, said baffle being open only at the bottom thereof, means forming a communication from the interior of said drum to the chamber exteriorly of said drum defined by said baffle, and a baffle plate carried by said drum below said last named means for preventing liquid in the chamber between the drum and said pier, from flowing downwardly towards the bottom of the pier.

HARLOWE HARDINGE.